(12) United States Patent
Stocker

(10) Patent No.: US 7,209,267 B2
(45) Date of Patent: Apr. 24, 2007

(54) MULTIPLE RESOLUTION SCANNER WITH IMPROVED LAMP INTENSITY MONITORING CAPABILITIES

(75) Inventor: Steven Orville Stocker, Escondido, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 707 days.

(21) Appl. No.: 10/633,128

(22) Filed: Aug. 1, 2003

(65) Prior Publication Data
US 2004/0095614 A1    May 20, 2004

Related U.S. Application Data

(63) Continuation of application No. 09/652,843, filed on Aug. 31, 2000, now Pat. No. 6,667,817.

(51) Int. Cl.
*H04N 1/04* (2006.01)
(52) U.S. Cl. .......... 358/474; 358/475; 358/494; 358/497
(58) Field of Classification Search .......... 358/475, 358/474, 494, 497, 471, 461, 464
See application file for complete search history.

(56) References Cited

U.S. PATENT DOCUMENTS 4,806,780 A    2/1989  Yamamoto et al.
5,278,674 A    1/1994  Webb et al.
5,969,845 A    10/1999 Tsai et al.
6,424,748 B1   7/2002  Ting-Shan

FOREIGN PATENT DOCUMENTS

| JP | 57-152863 | 9/1982 |
|----|-----------|--------|
| JP | 04-212560 | 8/1992 |
| JP | 06-098099 | 4/1994 |
| JP | 10-224624 | 8/1998 |

OTHER PUBLICATIONS

English translation of Japanese Office Action dated Aug. 1, 2006.

*Primary Examiner*—Jerome Grant
*Assistant Examiner*—Houshang Safaipour

(57) ABSTRACT

A scanner including first and second light monitor elements and a light redirection system operable in a first mode to focus light reflected from a scanned object and the first light monitor element onto a sensor and operable in a second mode to focus light reflected from the object and the second light monitor element onto the sensor. The light monitor elements are arranged such that the first light monitor element will not interfere with scans in the second mode, which may be a high resolution scan mode, and the second light monitor element will not interfere with scans in the first mode, which may be a normal resolution scan mode.

13 Claims, 3 Drawing Sheets

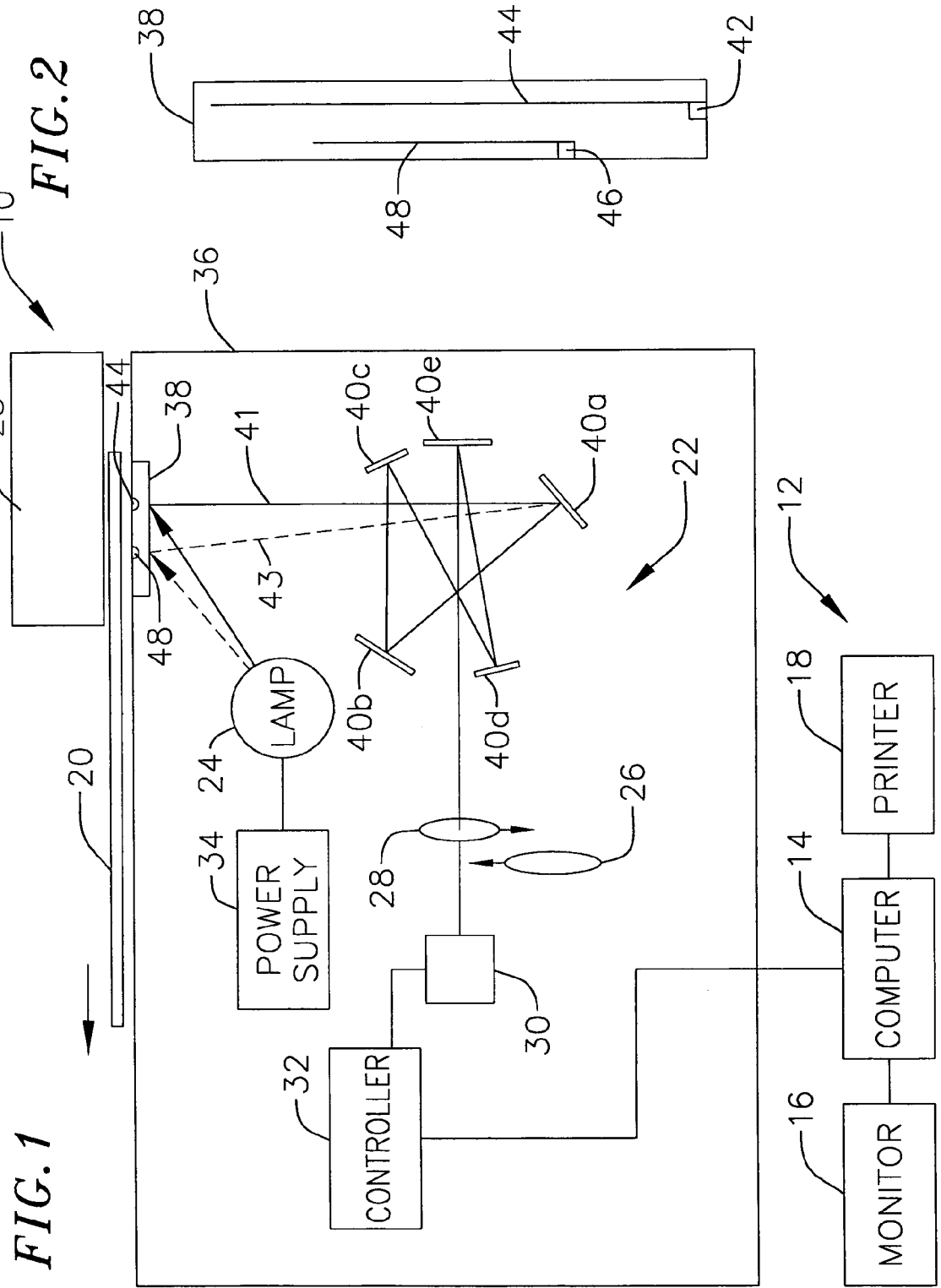

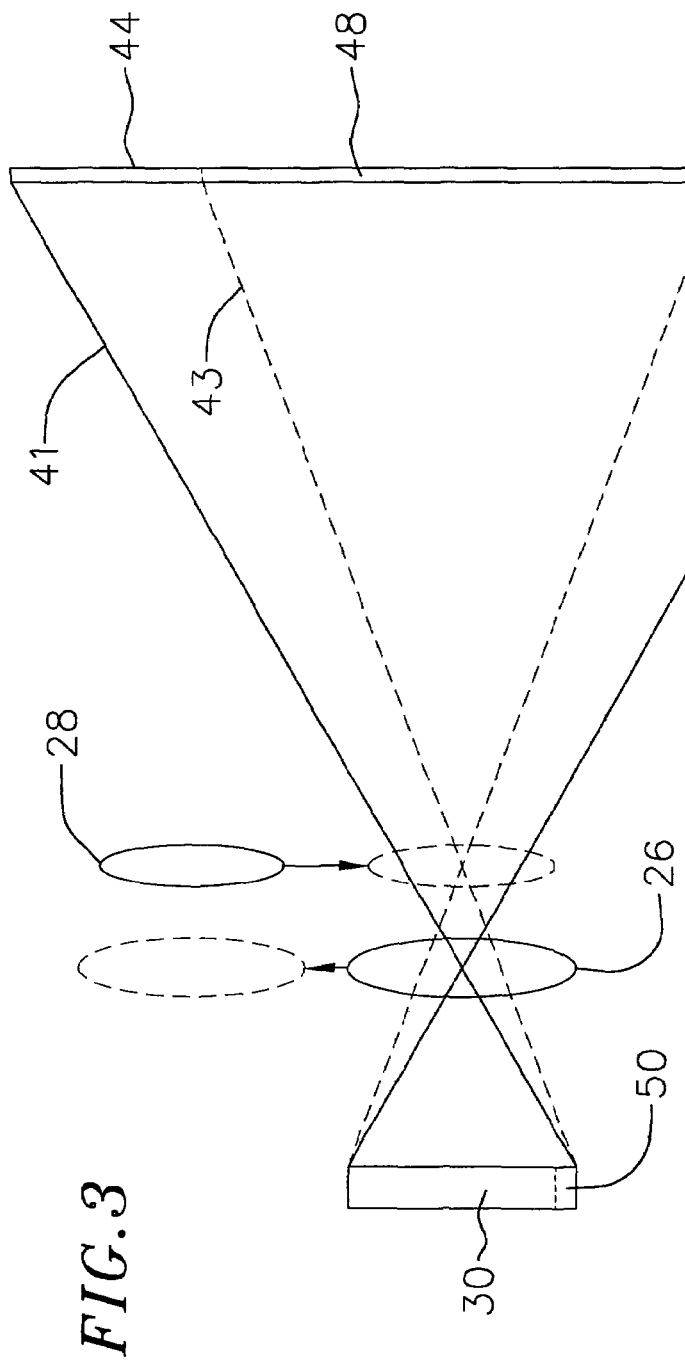
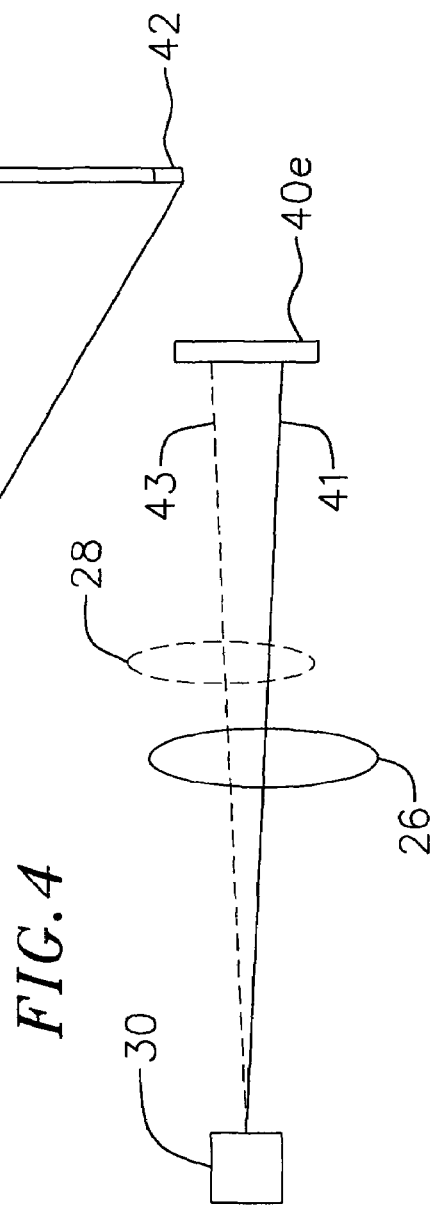
FIG.3
FIG.4

MULTIPLE RESOLUTION SCANNER WITH IMPROVED LAMP INTENSITY MONITORING CAPABILITIES

This is a continuation of application Ser. No. 09/652,843, filed on Aug. 31, 2000, now U.S. Pat. No. 6,667,817, which is incorporated herein by reference.

BACKGROUND OF THE INVENTION

1. Field of the Invention

The present invention relates generally to scanners and, more particularly, to multiple resolution scanners.

2. Description of the Related Art

Optical scanners are found in a variety of devices including, but not limited to, stand alone scanning devices, facsimile machines, copiers and combination scanner-copier-printer-facsimile machines. The optical scanners capture and digitize images of, for example, printed matter such as text and photographs on sheets of paper or other substrates. The digitized images can be printed, transmitted to a remote location, or electronically stored for later printing, transmission, processing or manipulation.

Conventional optical scanners include a charge coupled device (CCD) sensor or other linear array of photoelectric sensing elements, a light source, an analog amplifier, an analog-to-digital converter, a controller and a random access memory. CCD sensors typically include a large number of photoelectric sensing elements, each capturing light representing a single pixel of the image. The sensing elements, which are arranged in a linear array, will capture a line of pixels. As such, an object can be scanned one line at a time by moving the array relative to the object (in, for example, a flat bed scanner) or by moving the object relative to the array (in, for example, a sheet fed scanner). The light source is typically a lamp, such as a cold cathode lamp or a xenon lamp. Light from the source that is either reflected from an object, or transmitted through the object, is focused onto the CCD sensor with a mirror and lens arrangement. Each photoelectric sensing element converts the light that it receives into an electric charge, the magnitude of which depends on the intensity of the light and the exposure time. The charges are converted into analog voltages via the analog amplifier and the analog voltages are then digitized by the analog-to-digital converter.

Some optical scanners are capable of operating in two or more resolution modes. The resolution level is varied by varying the size of the object that is projected onto the sensing elements without varying the number of sensing elements that are being used. The smaller the object, the higher the resolution. The resolution level is changed through the use of interchangeable lenses. For example, one lens may cause an 8½ inch object to be projected onto the sensing element, while another may reduce the size of the object to 4 inches by focusing the middle portion of the text or image bearing substrate onto the same sensing element.

One problem associated with conventional optical scanners is the reduction in image quality that is caused by variations in the intensity of the light emitted by the lamp. Such variations occur while the lamp is warming up to its operating temperature, where the light intensity is stable. Cold cathode lamps, for example, can take up to 60 seconds or longer to warm up. Light intensity at the operating temperature will also vary over time as the lamp ages. This problem is especially acute in color scanners where the intensities of red, green and blue change with respect to one another when the light intensity changes, which leads to hue errors. Thus, despite the fact that optical scanners typically performed "white reference" and "black reference" calibrations at start up, variations in light intensity during scanning operations were problematic.

A conventional solution to this problem was to simply delay the scanning process for a predetermined period sufficient to allow the lamp to reach its operating temperature, which is inconvenient. The delays can be eliminated through use of xenon lamps because they reach their operating temperature quickly. However, xenon lamps are expensive. Moreover, delaying the scanning process and/or using xenon lamps does not address the issue of light intensity variations over the life of the lamp.

More recently, optical scanners have been introduced that monitor the intensity of the lamp during each scan and automatically compensate for any variations in lamp intensity. Here, the mirror and lens arrangement focuses light that is reflected from a known reference (or "lamp monitor element"), such as a white patch located at one of the lateral edges of the object, onto a predetermined number of sensing elements of the CCD during the entire document scan. A light intensity compensation signal is generated for each pixel row based on the difference, if any, between the actual voltages generated by the sensing elements and the expected voltage. The compensation signal is used by the controller to adjust the signals where necessary. One example of a scanner that incorporates such a reference arrangement is disclosed in commonly assigned U.S. Pat. No. 5,278,674, which is incorporated herein by reference.

Although conventional scanners with lamp intensity monitoring capabilities are useful, the inventor herein has determined that these capabilities have not been fully implemented in multiple resolution scanners. The inventor has further determined that the failure to heretofore combine lamp intensity monitoring and multiple resolution scanning has been due to the fact that the conventional lamp monitor element, which is at the lateral edge of the object during a normal resolution scan, is not included in a higher resolution scan. Moreover, simply moving the lamp monitor element inwardly to a position where it will be at the lateral edge of the object in a higher resolution scan (or adding a second lamp monitor element at this position) will interfere with a normal resolution scan. Thus, conventional multiple resolution scanners could only monitor lamp intensity in the normal resolution mode and required users to wait for the lamp to reach its operating temperature before scanning in the higher resolution mode(s).

SUMMARY OF THE INVENTION

Accordingly, one object of the present invention is to provide a scanner that avoids, for practical purposes, the aforementioned problems in the art. In particular, one object of the present invention is to provide a multiple resolution scanner that can monitor lamp intensity in multiple resolution modes. Another object of the present invention is to provide a multiple resolution scanner with multiple lamp monitor elements. Still another object of the present invention is to provide a scanner that can scan in a high resolution mode as the lamp warms up.

In order to accomplish some of these and other objectives, a scanner in accordance with one embodiment of a present invention includes first and second lamp monitor elements and a light redirection system operable in a first mode to focus light reflected from a scanned object and the first lamp monitor element onto a sensor and operable in a second mode to focus light reflected from the object and the second lamp monitor element onto the sensor. The lamp monitor elements are arranged such that the first lamp monitor element will not interfere with scans in the second mode, which may be a high resolution scan mode, and the second lamp monitor element will not interfere with scans in the first mode, which may be a normal resolution scan mode.

Such a scanner provides a number of advantages over conventional scanners. For example, the present invention allows multiple resolution scanners to be provided with lamp intensity monitoring and compensation capabilities which were heretofore unavailable. Because lamp monitor elements are provided for each of the scan modes in such a way that they will not interfere with scanning operations in the other modes, the present invention enables the use of lamp monitor elements in both normal and high resolution scan modes. The present invention also enables the use of a high resolution scan mode during warm up.

The above described and many other features and attendant advantages of the present invention will become apparent as the invention becomes better understood by reference to the following detailed description when considered in conjunction with the accompanying drawings.

BRIEF DESCRIPTION OF THE DRAWINGS

Detailed description of preferred embodiments of the invention will be made with reference to the accompanying drawings.

FIG. 1 is a diagrammatic view of a scanner and computer system in accordance with a preferred embodiment of the present invention.

FIG. 2 is a plan view of the housing window of the scanner illustrated in FIG. 1.

FIG. 3 is a top diagrammatic view of light paths for normal and high resolution scanning modes showing the reflected light as it approaches and passes through the lens assemblies in accordance with a preferred embodiment of the present invention.

FIG. 4 is a side diagrammatic view of light paths for normal and high resolution scanning modes showing the reflected light as it approaches and passes through the lens assemblies in accordance with a preferred embodiment of the present invention.

DETAILED DESCRIPTION OF THE PREFERRED EMBODIMENT

Figure 5:
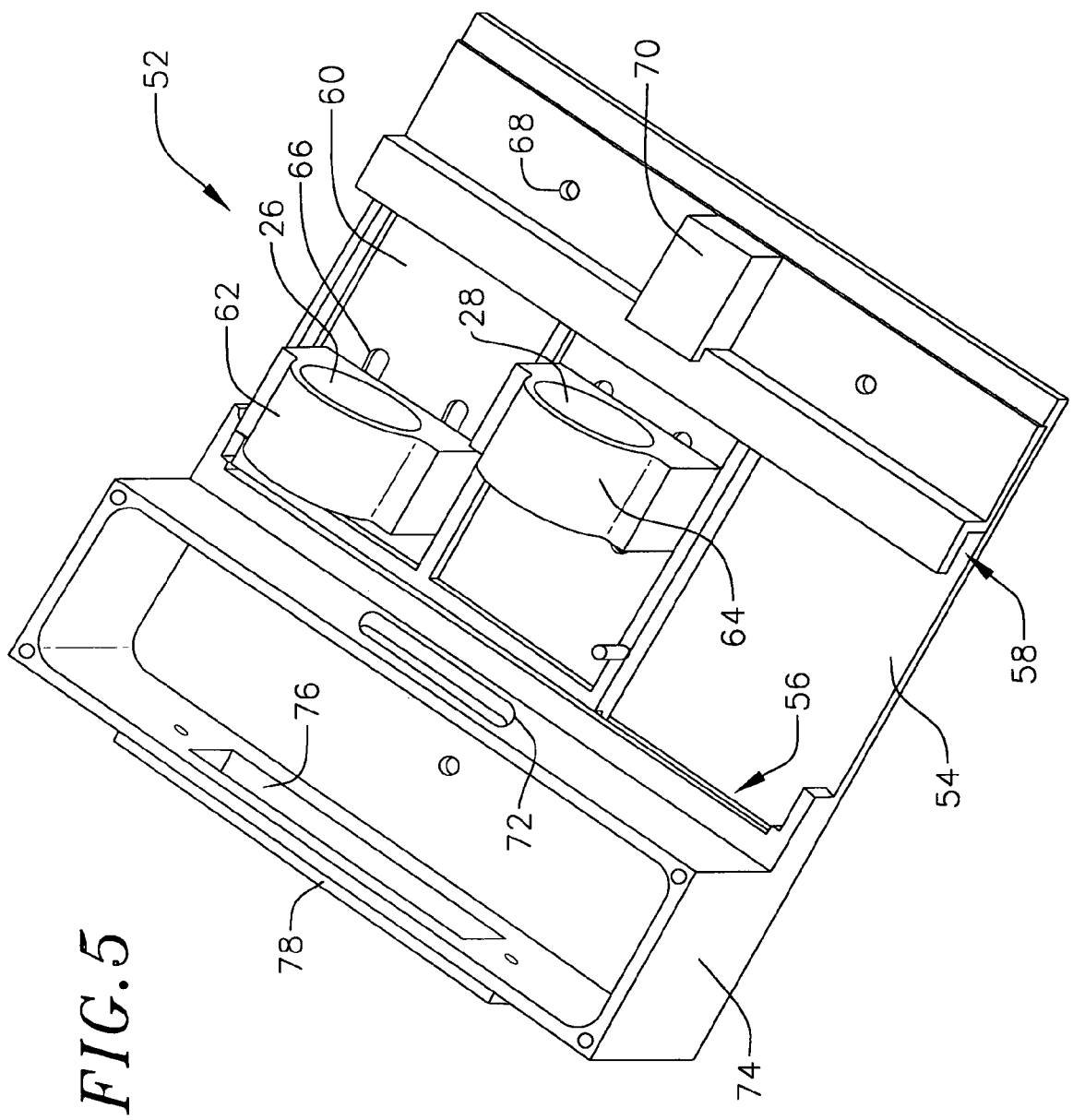
FIG. 5 is a perspective view of a lens assembly exchange device in accordance with a preferred embodiment of the present invention.

The following is a detailed description of the best presently known mode of carrying out the invention. This description is not to be taken in a limiting sense, but is made merely for the purpose of illustrating the general principles of the invention. Additionally, it is noted that detailed discussions of various internal operating components of scanners which are not pertinent to the present inventions, such as the specifics of the image processing system, sheet feeding system and interaction with a computer, have been omitted for the sake of simplicity.

As illustrated for example in FIG. 1, a scanner 10 in accordance with a preferred embodiment of the present invention may be used in combination with a computer system 12 that includes a computer 14, a monitor 16 and a printer 18. The scanner 10 allows images on a document 20 (or other object) to be scanned, converted into an electrical signal, processed, and digitized by an optical scanning system 22. The images may then be transferred to the computer 14 for storage, display on the monitor 16 or reproduction with the printer 18.

Although the present invention is described in the context of the exemplary scanner 10, which is a stand alone scanning device that is used in combination with the computer system 12, the present invention may be embodied in any device that includes an optical scanning system. Such devices include, but are not limited to, facsimile machines, copiers, combination scanner-copier-printer machines and combination scanner-copier-printer-facsimile machines. Additionally, although the exemplary scanner 10 is a sheet fed scanner wherein the document is moved relative to the optical scanning system by a document feeder 23, the present invention may be embodied in a device wherein at least a portion of the optical scanning system is moved relative to the document, such as a flat bed scanner.

The exemplary optical scanning system 22 may include a light source 24, a pair of interchangeable lens assemblies 26 and 28, and a sensor array 30. Suitable light sources include cold cathode lamps, hot cathode lamps, LEDs and xenon lamps. Suitable sensor arrays include CCDs that are configured in a linear array of discrete sensing elements ranging in size from 4 microns to 8 microns. Each lens assembly may consist of one or more lenses. The lens assemblies 26 and 28 in the exemplary embodiment are multiple-lens lens assemblies which are commercially available from Largan Optical, a division of Largan, Inc. and Asia Optical Co., Inc., both located in Taiwan. Lens assembly 26 will preferably focus a light monitor element and an 8½ inch scan line onto the sensor array 30, while lens assembly 28 will preferably focus a light monitor element and a 4 inch scan line onto the same portion of the sensor array to provide a higher resolution scan. Electrical signals from the sensor array 30 are processed and digitized by a controller 32. The controller 32 also controls the operation of the light source power supply 34. The power supply 34, in turn, controls the intensity level of the light source 24 by varying the amount of electrical energy that is supplied to the light source.

The preferred embodiment illustrated in FIG. 1 is also provided with a housing 36 that encloses the optical scanning system 22 and includes a window 38 formed from glass or any other suitable material. The window 38 can also simply be an uncovered opening in the housing 36. The document 20 is irradiated by the light source 24 as it passes over the window 38. The intensity level of the light should be sufficient to permit the image on the document 20 to be illuminated and differentiated during the conversion of the image into electrical signals that are indicative of the image. Light that is reflected from the document is redirected by a series of mirrors 40a–e to one of the lens assemblies 26 and 28. The path of the light for a normal resolution scan is shown by solid lines 41, while the light path for a high resolution scan is shown by dash lines 43 (only a few of the dash lines 43 are shown in FIG. 1 for clarity). The lens assembly, in turn, focuses the light onto the sensor array 30.

Light is reflected and focused onto the sensor array 30 one pixel row (or "scan line") at a time. As illustrated for example in FIGS. 1 and 2, a first light monitor element 42 is positioned at the lateral edge of a normal resolution scan line 44. In accordance with the present invention, a second light monitor element 46 is located at the lateral edge of a high resolution scan line 48. Normal resolution is 600 dpi in the preferred embodiment, but may range from 150 dpi to 1200 dpi and high resolution is preferably 1200 dpi, but may range from 300 dpi to 4800 dpi or higher. The significance of the second light monitor element 46 is discussed in detail below. The light monitor elements 42 and 46 are preferably thin pieces of plastic that are positioned on, over or under the window 38 and are about 4 mm×3 mm in size. White coatings may also be used. Other light monitor elements include mirrors, lenses and lens and mirror arrangements that direct light onto the applicable portion of the sensor array 30. When no glass or other material is used, and the window 38 is simply an uncovered opening in the housing 36, the light monitor elements 42 and 46 will be mounted onto the housing such that they project into the window (and light path).

The light monitor elements 42 and 46 each perform the same function, i.e. providing a reference that is used by the controller 32 to insure that images are accurately and uniformly reproduced despite variations in light source intensity during the warm up period and variations in light source intensity due to aging of the light source 24. More particularly, the light that is reflected by the light monitor element is focused on a relatively small number of sensing elements 50 located on one of the longitudinal edges of the sensor array 30. [Note FIG. 3.] A typical number would be about 5 or 6 sensing elements. A light intensity compensation signal is generated for each pixel row based on the difference, if any, between the actual voltages generated by the sensing elements 50 and the expected voltage generated by the sensing elements.

The compensation signal is used to vary the gain of the signal from the sensor array 30. Analog signals from the sensor array 30 are amplified by an amplifier and converted from analog to digital by an A/D converter. The signals are analyzed by the controller 32 and, if necessary, a compensation signal is generated. The compensation signal is converted into an analog signal by a D/A converter and is then supplied to the amplifier to adjust the gain.

In accordance with a preferred embodiment of the present invention, and as illustrated in FIGS. 2 and 3, the high resolution scan line 48 is offset from the normal resolution scan line 44 by, for example, about 2 mm to 4 mm in the scan direction. The "scan direction" is, of course, the direction that the document 20 is moving in the exemplary sheet fed embodiment or the direction that a portion of the scanning system is moving in a flat bed scanner. Such positioning results in the high resolution light monitor element 46 being offset from the normal resolution scan line 44 by about 2 mm to 4 mm and, therefore, prevents the high resolution light monitor element from interfering with a normal resolution scan.

The scan position may be adjusted from the normal resolution scan line 44 to the high resolution scan line 48 as follows. Reflected light is directed towards the interchangeable lens assembly (26 or 28) in light source intensity that has been moved into the operative (or "use") position by the exchange device 52 described below with reference to FIG. 5. In order to focus light from different portions of the window 38 onto the sensor array 30, i.e. light from the portions corresponding to the normal and high resolution scan lines 40 and 44, the lens assemblies 26 and 28 may be either differently angularly oriented when in the operative position, positioned at different vertical locations when in the operative position, positioned in different longitudinal locations (i.e. along the axis defined by the reflected light as it approaches the lens) when in the operative position, or any combination thereof. As illustrated for example in FIGS. 3 and 4, the operative positions of the lens assemblies 26 and 28 are both vertically and longitudinally offset from one another in the preferred embodiment.

Alternatively, one or more of the mirrors 40a–e may be reoriented when the scanner 10 switches between normal and high resolution scanning modes. Such reorientation would cause the reflected light from the high resolution scan line 44 to travel from the mirror 40e to the lens assembly 28 along the same angular path that the reflected light from the normal resolution scan line 40 would travel from the mirror 40e to the lens assembly 26, thereby eliminating the need for a different vertical orientation.

An exemplary lens assembly exchange device, which is generally represented by reference numeral 52, is illustrated in FIG. 5. The exemplary lens exchange device includes a base member 54 that has a pair of slots 56 and 58 formed therein. A shuttle 60 is positioned within the slots 56 and 58 such that it can slide laterally relative to the base member 54. Although not limited to such devices, an electric motor/worm and follower arrangement or a manually powered slider (neither shown in the Figures) are examples of devices that may be used to move the shuttle 60 back and forth. The shuttle 60 supports a pair of lens housings 62 and 64. Lens assembly 26, which is used to focus light onto the sensor array 30 during a normal resolution scan is housed within housing 62, while lens assembly 28, which is used to focus light onto the sensor array during a high resolution scan is housed within housing 64. The shuttle 60 also includes a series of slots 66 in which the lens housings 62 and 64 ride. The slots 66 allow the positions of the lens housings 62 and 64 to be fine tuned during manufacture. A series of mounting holes 68 may be used to secure the lens exchange device within the scanner 10.

Other apparatus for moving the lens assemblies 26 and 28 between their respective operable and non-operable positions may also be employed. For example, the lens assemblies 26 and 28 may be mounted on a rotatable device that would position them in the same positions as the lens assembly exchange device 52.

Light from the mirrors 40a–e passes a ball and detent device 70 on its way to the lens assembly that is in the operable position (lens assembly 28 in FIG. 5). The ball and detent device includes a rearwardly facing spring loaded ball that mates with a detent in the shuttle 60 to align the shuttle and secure it in place prior to and during scanning. The light is redirected by the lens through an opening 72 in an internal housing 74 that prevents stray light, i.e. light other than that being focused by the lens assembly in the operable position, from impinging on the sensor array 30. The light passes through the internal housing 74, whose cover is removed in FIG. 5, and then through an opening 76 to the sensor array 30 which is mounted within a frame 78. Image processing then proceeds in the manner described above. In addition to covering the internal housing, the cover (not shown) will preferably include an awning-like portion that extends beyond the housing above the opening 72.

Although the present invention has been described in terms of the preferred embodiment above, numerous modifications and/or additions to the above-described preferred embodiment would be readily apparent to one skilled in the art. By way of example, but not limitation, a black light monitor element may be used instead of a white light monitor element. Also, additional scan lines and white (or black) light monitor elements may be added should additional resolution levels be desired. It is intended that the scope of the present invention extends to all such modifications and/or additions.

I claim:

1. A scanner for scanning an object, comprising:
    first and second light monitor elements; and a scanning system including
  a sensor,
  a light source adapted to direct light onto the object and onto the first and second light monitor elements such that light is reflected from the object and first and second light monitor elements, and
  a light redirection system operable in a first mode to focus light reflected from the object and the first light monitor element onto the sensor and operable in a second mode to focus light reflected from the object and the second light monitor element onto the sensor.

2. A scanner as claimed in claim 1, wherein the sensor comprises a plurality of sensing elements.

3. A scanner as claimed in claim 1, wherein the sensor comprises a charge coupled device.

4. A scanner as claimed in claim 1, wherein at least one of the first and second light monitor elements comprise white light monitor elements.

5. A scanner as claimed in claim 1, wherein each of the first and second light monitor elements comprise white light monitor elements.

6. A scanner as claimed in claim 1, wherein the light source comprises a lamp.

7. A scanner as claimed in claim 1, wherein the object is scanned in a scan direction and the first and second light monitor elements are offset in the scan direction.

8. A scanner as claimed in claim 7, wherein the first and second light monitor elements are offset in a direction perpendicular to the scan direction.

9. A scanner as claimed in claim 7, wherein the sensor includes a reference area and the light reflected from the first light monitor element is reflected onto the reference area in the first mode and light from the second light monitor element is reflected onto the reference area in the second mode.

10. A scanner as claimed in claim 1, wherein the light redirection system includes first and second lens assemblies, the first lens assembly being movable between first operable and non-operable positions and the second lens assembly being movable between second operable and non-operable positions.

11. A scanner as claimed in claim 10, wherein the first operable position is offset from the second operable position in at least one direction.

12. A scanner for scanning an object in a scan direction, comprising:
  a housing including a window;
  first and second light monitor elements associated with the window and offset from one another in the scan direction; and
  a scanning system including a sensor, the scanning system being operable in a first mode to focus a region of the object and the first light monitor element onto the sensor and operable in a second mode to focus a region of the object and the second light monitor element onto the sensor.

13. A scanner as claimed in claim 12, wherein the first and second light monitor elements are offset from one another in a direction perpendicular to the scan direction.

* * * * *